United States Patent
Nakamura et al.

(10) Patent No.: US 7,312,883 B2
(45) Date of Patent: Dec. 25, 2007

(54) IMAGE FORMING SYSTEM WITH PERIPHERAL DEVICE AND VERSION UPGRADE PROCESS

(75) Inventors: Yoshinobu Nakamura, Ebina (JP); Keiji Sawada, Ebina (JP); Tsuyoshi Seto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 769 days.

(21) Appl. No.: 10/270,117

(22) Filed: Oct. 15, 2002

(65) Prior Publication Data

US 2003/0231333 A1 Dec. 18, 2003

(30) Foreign Application Priority Data

Jun. 17, 2002 (JP) .............................. 2002-175249

(51) Int. Cl.
*G06K 15/00* (2006.01)
*G06F 3/12* (2006.01)

(52) U.S. Cl. ..................................... 358/1.14; 358/1.15
(58) Field of Classification Search ............... 358/1.14, 358/1.15, 1.16; 717/168; 710/15, 17, 19; 709/221

See application file for complete search history.

(56) References Cited

U.S. PATENT DOCUMENTS

| | | | | |
|---|---|---|---|---|
| 5,629,775 A | * | 5/1997 | Platteter et al. ............. | 358/296 |
| 5,872,569 A | * | 2/1999 | Salgado et al. ............. | 715/764 |
| 6,091,508 A | * | 7/2000 | Love et al. ................. | 358/1.15 |
| 6,467,087 B1 | * | 10/2002 | Yang .......................... | 717/168 |
| 6,681,392 B1 | * | 1/2004 | Henry et al. ................ | 717/176 |
| 6,915,514 B1 | * | 7/2005 | Machida ..................... | 717/174 |
| 7,065,770 B2 | * | 6/2006 | Nomura et al. ............. | 719/327 |
| 2002/0097407 A1 | * | 7/2002 | Ryan et al. .................. | 358/1.1 |
| 2002/0114000 A1 | * | 8/2002 | Kobayashi ................. | 358/1.15 |
| 2002/0135791 A1 | * | 9/2002 | Rodriquez ................. | 358/1.12 |
| 2002/0170051 A1 | * | 11/2002 | Watanabe et al. ........... | 717/168 |
| 2003/0149917 A1 | * | 8/2003 | Smith et al. ................. | 714/38 |

FOREIGN PATENT DOCUMENTS

JP 2001067228 A * 3/2001

* cited by examiner

*Primary Examiner*—Douglas Q. Tran
(74) *Attorney, Agent, or Firm*—Morgan, Lewis & Bockius LLP

(57) ABSTRACT

An image forming system comprises a request analysis section which analyzes an input image forming process request and specifies a peripheral device for use in executing an image forming process and a judgment section to judge whether or not a version upgrade is performed in the peripheral device. A process execution control section executes the process when it is judged that no version upgrade is being performed in the peripheral device, and instructs an input/output section to display, via a report section, a message indicating a version upgrade being performed when it is judged that a version upgrade is being performed. In this manner, user convenience during version upgrade time is enhanced.

16 Claims, 4 Drawing Sheets

JOB QUEUE

| RECEIVED ORDER | JOB | PERIPHERAL DEVICE |
|---|---|---|
| 1 | JOB 1 | PERIPHERAL A |
| 2 | JOB 2 | PERIPHERAL B |
| 3 | JOB 3 | PERIPHERAL A |
| 4 | JOB 4 | PERIPHERAL B |

| EXECUTION ORDER | JOB | PERIPHERAL DEVICE |
|---|---|---|
| 1 | JOB 2 | PERIPHERAL B |
| 2 | JOB 4 | PERIPHERAL B |

IMAGE FORMING SYSTEM WITH PERIPHERAL DEVICE AND VERSION UPGRADE PROCESS

BACKGROUND OF THE INVENTION

1. Field of the Invention

The present invention relates to an image forming system, and more particularly to execution control of an image forming process cooperated with the image forming apparatus in upgrading a version of control program executed by a peripheral device.

2. Description of the Related Art

Many image forming apparatuses such as copy machines, particularly relatively large sophisticated image forming apparatuses including CPUs, can optionally be connected to peripheral devices such as finishers and feeders. For the connected peripheral devices to function, the respective peripheral devices require an appropriate control program. In recent years, however, in order to reduce processing loads on the image forming apparatus and in conjunction with increasing sophistication of such peripheral devices, a CPU and a memory have also been provided on a peripheral side, and the control program for the peripheral device is stored in the memory mounted on the peripheral device, and executed by the CPU mounted on the peripheral device.

When an image forming process request is entered into a job queue in response to a request for an image forming process, the image forming apparatus forms data as a printing object into a raster image on sheets, and subsequently sends the sheets to, for example, a finisher. The finisher executes a processing such as bookbinding in accordance with the control program.

As described above, the peripheral device executes the control program to operate in conjunction with the image forming apparatus to fulfill a predetermined function. The control program version is appropriately upgraded in accordance with the expansion of the functionality of the peripheral device or the like.

Although in a conventional image forming system it is possible to take measures to deal with trouble generated in, for example, the peripheral device can be taken, such systems have heretofore not been constituted to appropriately keep pace with upgrading of the peripheral device control program. As a result, such systems are brought into an unusable state. Consequently, in consideration of user convenience, there has been a demand for execution control of an image forming process when software is upgraded.

SUMMARY OF THE INVENTION

The present invention has been developed to solve the above-described problem, and an object thereof is to provide an image forming system in which user convenience during control program upgrading is enhanced.

To achieve the above-described object, according to one aspect of the present invention, there is provided an image forming system comprising an image forming apparatus which executes an image forming process in response to an inputted image forming process request and a peripheral device connected to the image forming apparatus and which executes an installed control program to operate and includes version upgrade means for upgrading a version of the control program based on input program data, said image forming apparatus including process execution control means for limiting execution of the image forming process when a request for an image forming process employing a peripheral device is input while a version upgrade process is being performed by the version upgrade means of that device.

Moreover, the process execution control means may include a judgment section to judge whether or not the version upgrade means is executing a version upgrade in the peripheral device and a request analysis section which analyzes a process content of an input image forming process request and thereby specifies the peripheral device for use in executing the image forming process.

Furthermore, the process execution control means may be configured so as to reject an input request when the request for the image forming process requires use of a peripheral device being version-upgraded by its version upgrade means, and executes the image forming process in response to the request when the input request for an image forming process does not require use of the peripheral.

Additionally, when a request for the image forming process using said peripheral device in which a version upgrade process is being performed is inputted, said process execution control means accepts and reserves the request as a process to be executed after confirmation of the completion of the version upgrade in the peripheral device, without rejecting the request.

Moreover, the request analysis section divides the image forming process into a process step using said peripheral device in which a version upgrade process is being performed and a process step not using the peripheral device, and executes the process step not using said peripheral device and reserves the process step using said peripheral device as a process to be executed after confirmation of completion of the version upgrade in the peripheral device.

Furthermore, when said peripheral device is restarted at the end of the version upgrade performed by said version upgrade means, the process in said process execution control means is continued without restarting said image forming apparatus.

Additionally, the image forming apparatus further includes report means for reporting that said version upgrade means is performing a version upgrade and said peripheral device is therefore unavailable.

Moreover, the report means reports when the request for the image forming process using said peripheral device version-upgraded by said version upgrade means is inputted.

Furthermore, the judgment section detects a version upgrade signal sent from said version upgrade means to thereby recognize that a version upgrade is being performed.

Additionally, the judgment section sends an inquiry signal to said version upgrade means and judges whether or not a version upgrade is being performed based on a signal received in response to the inquiry signal.

Moreover, according to another aspect of the present invention, there is provided an image forming process control method in an image forming system including an image forming apparatus which executes an image forming process in response to an input image forming process request and at least one peripheral device which is connected to said image forming apparatus and which executes an installed control program, said method comprising the steps of limiting the execution of the request, when the input request for the image forming process involves use of said peripheral device in which a version upgrade process is being performed, and executing the image forming process in response to the request when the request for the image forming process does not use said peripheral device in which a version upgrade process is being performed.

Furthermore, the method further comprises a peripheral device specifying step of specifying the peripheral device for use in executing the image forming process, when the image forming process request is inputted and a judgment step of judging whether or not the control program is being updated in the peripheral device specified in said peripheral device specifying step.

Additionally, the method further comprises the steps of when a request for the image forming process is input while the control program of the peripheral device is being updated, reserving the request, first confirming that the version upgrade in the peripheral device has been completed, and subsequently starting execution of the process for the reserved request.

Moreover, the method further comprises a request analysis step of dividing the image forming process into a process step using said peripheral device and a process step not using the peripheral device and specifying a peripheral device for use in executing the image forming process, when the image forming process request is inputted, a first execution step of executing the process step not using said peripheral device in which a version upgrade is being performed and a second execution step of confirming that the version upgrade in the peripheral device has been completed and subsequently starting execution of the process step using said peripheral device with the version upgrade performed therein.

Furthermore, the method further comprises the steps of continuing the execution of the image forming process without restarting said image forming apparatus, when said peripheral device is restarted at the end of a version upgrade process.

Additionally, the method further comprises a reporting step of reporting that the peripheral device cannot be used when said judgment step judges that a version upgrade is being performed in said peripheral device.

According to the present invention, when the version upgrade is performed in the peripheral device, the execution of the image forming process using the peripheral device can be limited.

Moreover, the report means can report to a user, when the version upgrade is performed in the peripheral device.

Furthermore, when the image forming process is to be executed, the version upgrade is performed. In this case, the process is not rejected, and is reserved as the process which is to be started to be executed after the version upgrade end. Therefore, a process requester can issue the image forming process request without judging that the version upgrade process in the peripheral device is being executed or without waiting for the end of the version upgrade.

Additionally, the image forming process is divided into a process step portion requiring a process in the peripheral device and a portion not requiring the process. When the version upgrade is performed in the peripheral device, only the process step portion requiring the process in the peripheral device is reserved, and the other process step portions are executed beforehand. Therefore, the execution of the process can be ended more quickly after the process turns to an execution object as compared with the reservation of the whole image forming process.

Moreover, even when the peripheral device is restarted with the end of the version upgrade, the image forming apparatus is prevented from being restarted. Therefore, the image forming process request registered in the image forming apparatus is prevented from being canceled with the version upgrade on the peripheral device side.

DESCRIPTION OF THE PREFERRED EMBODIMENTS

Figure 1:
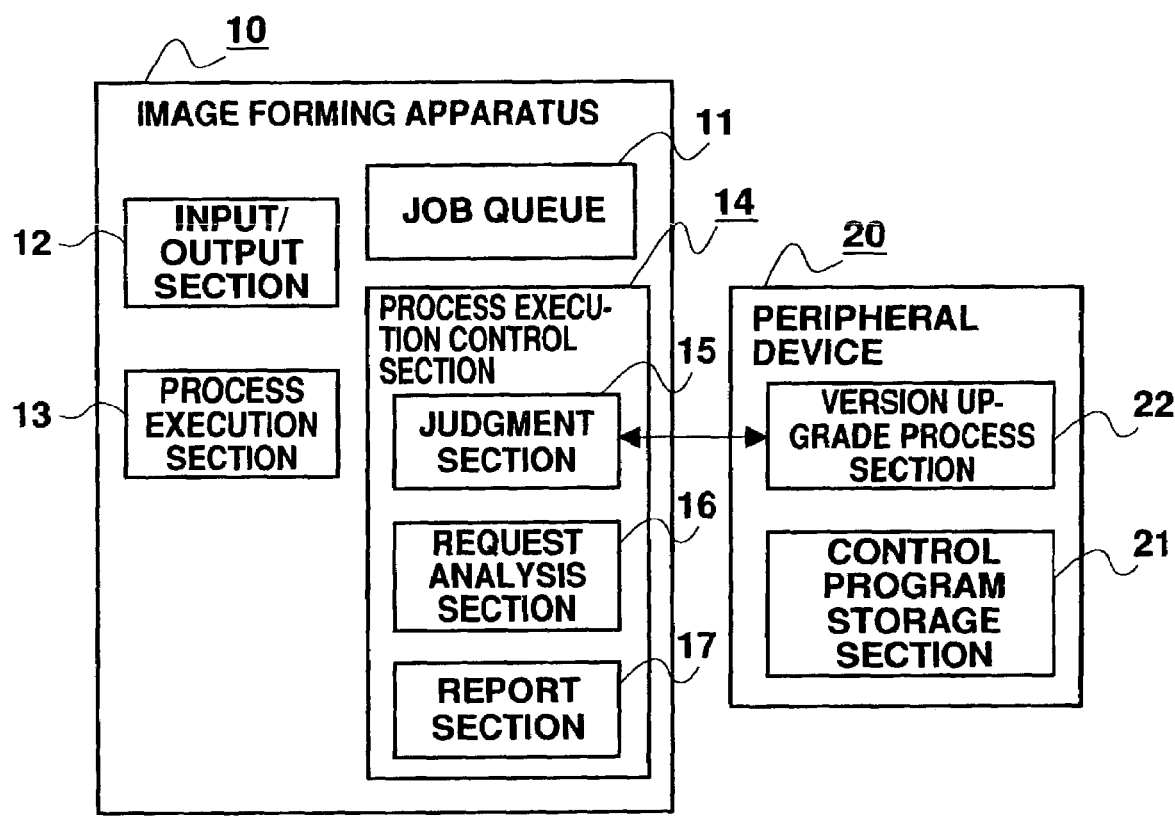
FIG. 1 is a diagram showing a first embodiment of an image forming system according to the present invention.

Preferred embodiments of the present invention will be described hereinafter with reference to the drawings and wherein a copy machine is used as an example of an image forming apparatus. Moreover, elements common among the respective embodiments are denoted by the same reference numeral in each embodiment.

First Embodiment

FIG. 1 is a diagram showing the configuration of a first embodiment of an image forming system according to the present invention. FIG. 1 shows an image forming apparatus 10 and peripheral device 20 constituting an image forming system. It is to be noted that while FIG. 1 shows only one peripheral device 20 for the sake of convenience, a plurality of peripheral devices can be connected. Examples of the image forming apparatus 10 in the present embodiment include a sophisticated copying machine including a computer processor, a facsimile apparatus, a printer, an image storage apparatus in which an input image is stored, and an apparatus having multiple or combined functions. The image forming apparatus can be connected to a plurality of peripheral devices 20. here, the peripheral device 20 is a sophisticated apparatus with a CPU or memory, which operates in conjunction with the image forming apparatus 10 in accordance with an installed control program and executes a predetermined processing, such as, for example, bookbinding. In the present embodiment, examples of the peripheral device include apparatuses connected to the image forming apparatus 10 such as a finisher, feeder, or scanner with an automatic draft feeder attached thereto.

The peripheral device 20 includes a control program storage section 21 in which the control program is stored, and a version upgrade process section 22 which upgrades a version of control program based on input program data, independent of the image forming apparatus 10. The control program storage section 21 can be realized by a writable memory such as an electrically erasable programmable read-only memory (EEPROM), and a processing function in the version upgrade process section 22 is realized by pre-installed software.

The image forming apparatus 10 includes a job queue 11, input/output section 12, process execution section 13, and process execution control section 14. The job queue 11 stores an input image forming process request as a job. The input/output section 12 is a user interface which inputs an execution control instruction of the job stored in the job queue 11, and displays a message indicating the version upgrade being executed, results of an image forming process, and the like. The process execution section 13 executes the image forming process in response to the image forming process request. The process execution control section 14 controls the execution of the process execution section 13 in accordance with the image forming process request or operation situations of the peripheral device 20. The process execution control section 14 in the present embodiment includes a judgment section 15 for judging whether or not the version upgrade process section 22 is performing a version upgrade, a request analysis section 16 which analyzes a process content of the input image forming process request and thereby specifies the peripheral device 20 for use by the execution of the image forming process, and a report section 17 which reports the status of the image forming process. The image forming apparatus 10 is connected to the peripheral device 20 via a private cable through which printing control is executed and through which data, such as a version upgrade signal described later, is transmitted.

Figures 2, 3A, 3B:
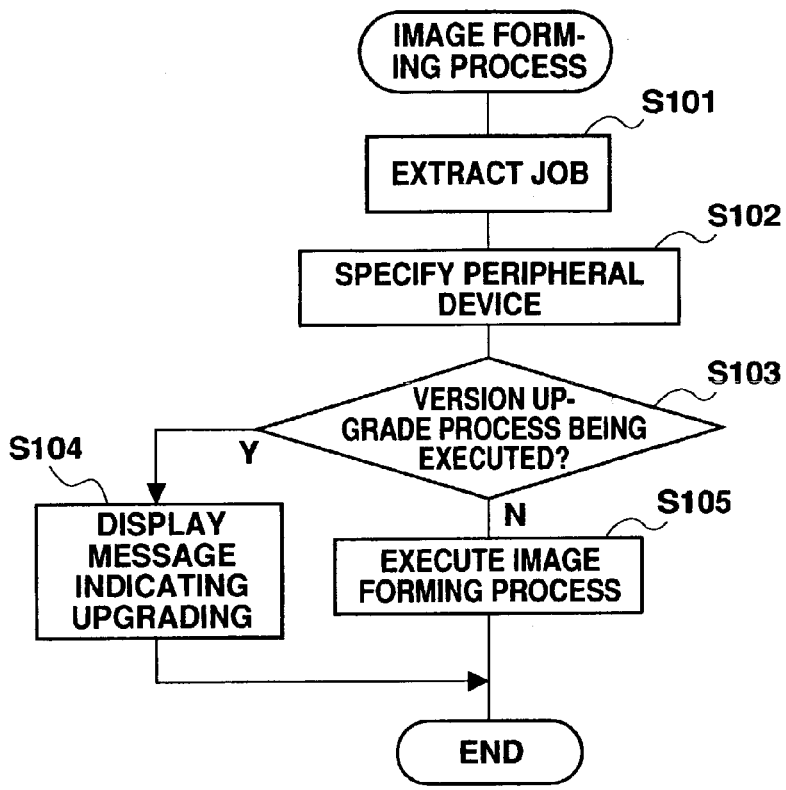
FIG. 2 is a flowchart showing an image forming process in the first embodiment.
FIGS. 3A and 3B are schematic diagrams showing a job to be executed according to the first embodiment.

An operation for executing the image forming process in the present embodiment will next be described with reference to a flowchart shown in FIG. 2. It is to be noted that the peripheral device 20 can be used as usual and the operation for making possible the image forming process may therefore be the same as a conventional operation outside the scope of the present invention. Therefore, detailed description of the process in a usual time is omitted. This also applies to the subsequent embodiments.

For the requested image forming process, the request is registered in the job queue 11, and a user designates a job to be executed. Thereafter, when a start button attached to the image forming apparatus 10 or displayed in a user interface screen disposed in the image forming apparatus 10 is pressed, the process is started. It is assumed that the process execution control section 14 extracts the image forming process request registered in the job queue 11 (step 101), and then starts the process. In such a case, the request analysis section 16 analyzes the content of the image forming process request and specifies the peripheral device 20 for use in executing the image forming process (step 102). Subsequently, the judgment section 15 judges whether or not the version upgrade is performed in the peripheral device 20 specified by the request analysis section 16 (step 103). Here, when it is judged that a version upgrade is being executed, the report section 17 does not allow the process execution section 13 to execute the image forming process based on the request, and instead cause the input/output section 12 to display a message indicating, for example, "copying using the requested peripheral device cannot be executed" (step 104). Such a display informs the user that the job is not being executed. When it is judged that no version upgrade is being executed in the peripheral device 20, the process execution control section 14 naturally allows the process execution section 13 to execute the image forming process as usual without rejecting the request (step 105).

In the above description, a single job (image forming process request) was described. In the following, a situation wherein a plurality of jobs are stored in the job queue 11 in a system constitution connected to a plurality of peripheral devices 20 will be described with reference to FIG. 3.

The image forming apparatus 10 is connected to at least two peripheral devices A, B. In the peripheral devices, a version upgrade is being executed in the peripheral device A, but not in the peripheral device B. Moreover, as shown in FIG. 3A, jobs are queued in a shown order in the job queue 11. FIG. 3 shows the peripheral device for use for each job. In such a situation, the jobs shown in FIG. 3A are successively executed with the result that jobs using the peripheral device B, in which no version upgrade is being performed, are as usual, as shown in FIG. 3B. For process jobs 1, 3 for the peripheral device A, a message is displayed indicating that the process cannot be executed at this time, as described above.

In a more specific example, one of the peripheral devices 20 is a finisher. For example, when a copy job including a stapling process and hole making process is requested and the control program of the finisher is then being upgraded, a message is displayed indicating "the requested copy using the finisher cannot be executed". Moreover, even when the version is being upgraded in the finisher, a request for a job not using the finisher is executed as usual without being rejected. For example, a copy job not including the stapling and hole making processes, a job for reading an image with a scanner and storing the image, or a job for reading the image with the scanner and transmitting the image to a remote area via a facsimile network or local area network are executed as usual. In another example, when one of the peripheral devices 20 is a scanner, and the control programming is being upgraded in the scanner, a message indicating "the requested copy process using the scanner cannot be executed" is displayed with respect to the copy job or facsimile transmission job using the scanner. On the other hand, a printing job, facsimile reception, or output of a facsimile-received image are executed as usual.

According to the present embodiment, the execution of the requested image forming process can be controlled as described above.

Additionally, the judgment section 15 can judge whether or not the version upgrade is being executed in the peripheral device 20 as follows.

While executing a version upgrade, the version upgrade process section 22 in the present embodiment transmits a version upgrade signal indicating that a version upgrade is being performed. The judgment section 15 continuously monitors the transmission state of such a signal. On detecting a version upgrade signal, the judgment section 15 judges that a version upgrade is being performed in the peripheral device 20. Alternatively, judgment may also be performed as follows.

That is, the judgment section 15 transmits an inquiry signal to the peripheral device 20 as a judgment object, when necessary, and makes an inquiry as to whether the version upgrade is executed. Upon receiving the inquiry from the judgment section 15, the version upgrade process section 22 returns a version upgrade signal in response to the inquiry signal from the judgment section 15, if a version upgrade is then being executed. The judgment section 15 detects the version upgrade signal returned to the inquiry signal and thereby judges that the version upgrade is performed.

The report section 17 instructs the input/output section 12 to display the message indicating that the peripheral device 20 is in an unusable state because of a version upgrade when the job to be processed requires the use of the peripheral device 20 with the version upgrade being performed therein, more specifically when the start button is pressed to start the execution of the job as described above, or when the function of the peripheral device 20 is selected during the execution of the job. However, the judgment section 15 judges that the version upgrade is being performed and that the peripheral device is therefore in an unusable state. A message indicating this may be displayed in the screen without waiting for a request for use of the peripheral device 20.

It is to be noted that while the message display on the display screen disposed in the image forming apparatus 10 by the input/output section 12 has been described as an example of the report in the report section 17 in the present embodiment, other reporting methods, such as, for example, by mail transmission to a process requester, may also be used.

Second Embodiment

Figure 4:
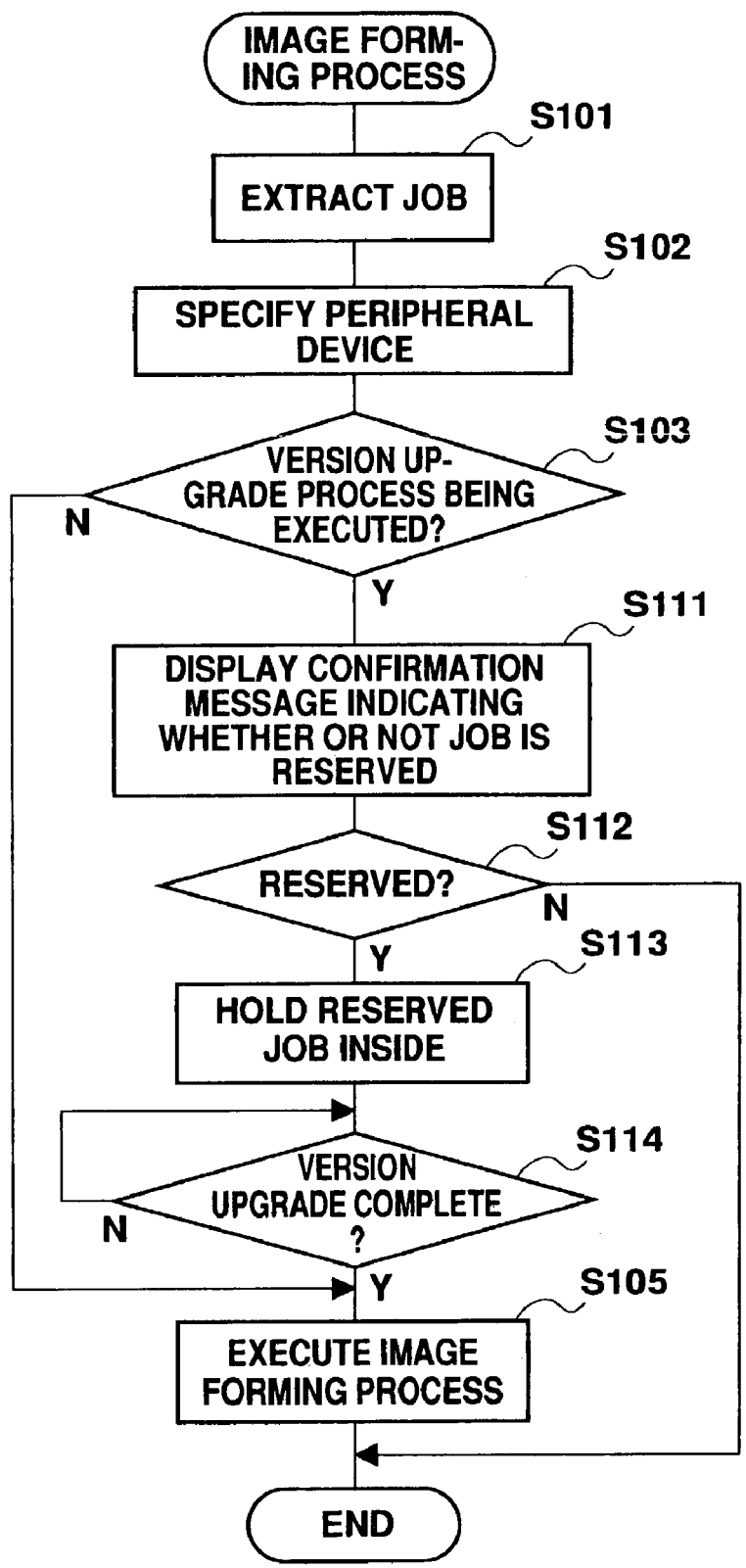
FIG. 4 is a flowchart showing the image forming process in a second embodiment of the present invention.

In the first embodiment as described above, when a version upgrade is being performed in the peripheral device 20 addressed in an image forming process request extracted from the job queue 11, the process execution control section 14 rejects the request without executing the image forming process. In a second embodiment of the present invention, on the other hand, instead of rejecting the request, the process execution control section 14 accepts the image forming process request as a reserved job, awaits confirmation that the version upgrade in the peripheral device 20 has been completed, and then starts execution of the reserved image forming process. A specific process operation will be described with reference to FIG. 4. It is to be noted that processes equivalent to those of the first embodiment are denoted with the same reference numerals. This is also done in the descriptions of the subsequent embodiments.

In an example wherein the process execution control section 14 extracts the image forming process request registered in the job queue 11 (step 101) and the starts the process, the request analysis section 16 analyzes the content of the image forming process request and specifies the peripheral device 20 for use in executing the image forming process (step 102). Subsequently, the judgment section 15 judges whether or not a version upgrade is being performed in the peripheral device 20 specified by the request analysis section 16 (step 103). When it is judged that a version upgrade is being performed, the report section 17 causes the request to be placed on standby without discarding the request, and causes the input/output section 12 to display a confirmation message indicating, for example, "The requested copy using the requested peripheral device cannot be executed. Press the start button and the copy will be saved." (step 111). In such a case, the execution of the process may be rejected when the start button is not pressed, similarly as in the first embodiment. On the other hand, when the start button is pressed, the process execution control section 14 in the second embodiment temporarily stores the reserved job (steps 112, 113). Thereafter, the judgment section 15 continuously monitors the status of the version upgrade in the peripheral device 20 (step 114). Upon recognizing that the version upgrade has been completed, the process execution control section 14 adjusts the job registered in the job queue 11 and starts execution of the reserved job (step 105).

An image forming system in which the execution control of the job can be executed in a trouble time of the peripheral device has heretofore existed. The system is common in that the peripheral device cannot be used during the trouble or version upgrade of the peripheral device. However, with the version upgrade, the state usually returns to a usable state in a short time as compared with the trouble. Moreover, with the trouble, there are possibilities that components need to be separately procured and that the unusable state lasts long. However, with the version upgrade, there is hardly such possibility. In the version upgrade time when the peripheral device 20 is returned into the usable state in a relatively short time, the job is discarded similarly as in the trouble time. Then, there is a possibility that user's convenience is impaired.

According to the second embodiment, when the peripheral device 20 is unavailable because of a version upgrade is being performed, the execution of the input job is not absolutely rejected, and may be accepted as a reserved job. Upon completion of the version upgrade, the execution of the reserved job is started. Therefore, the process requester (user) can register the image forming process request in the job queue 11 without checking whether or not the version upgrade in the peripheral device is being performed, and without waiting for the end of the version upgrade. As described above, in the second embodiment, the user's convenience can be achieved.

Third Embodiment

Figure 5:
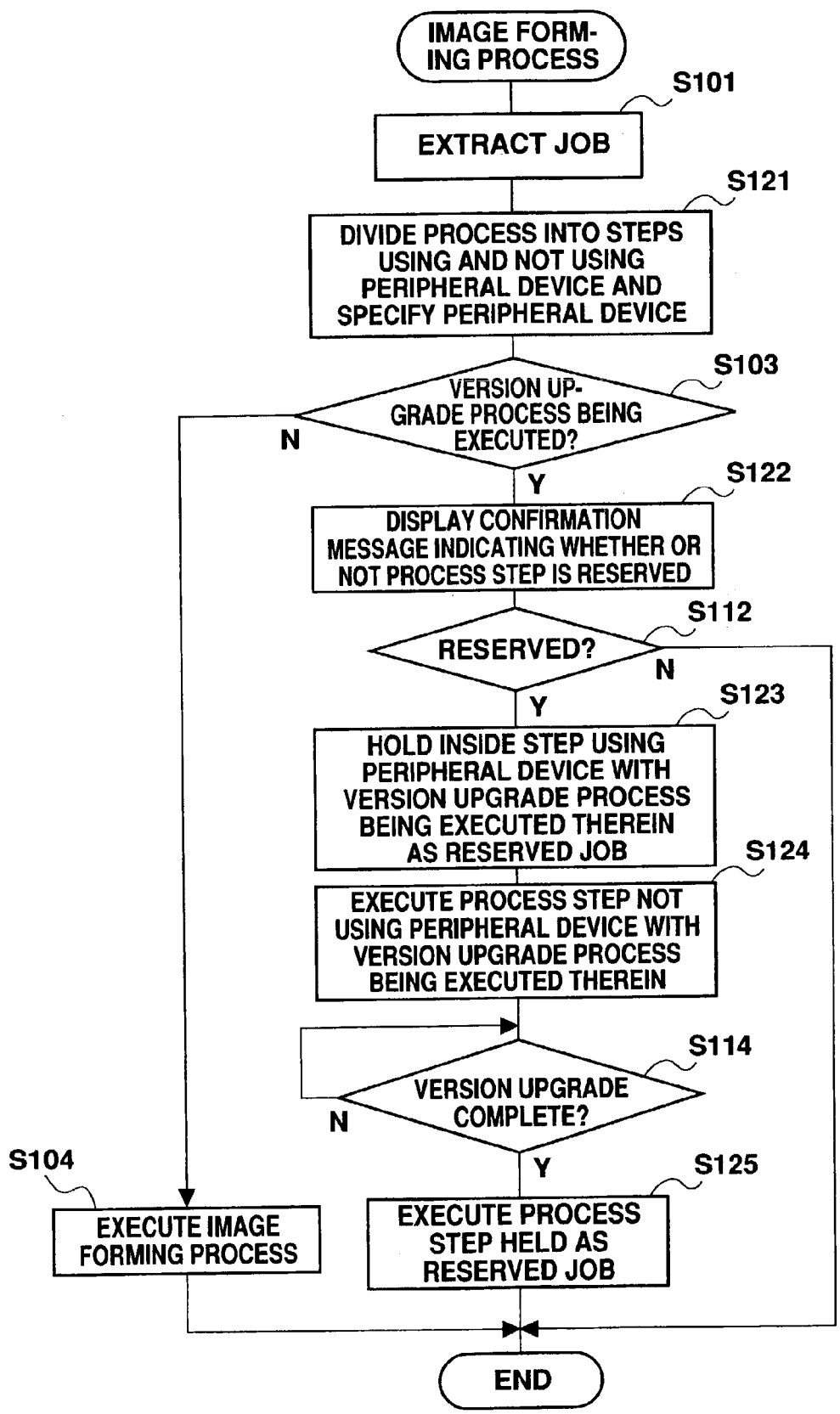
FIG. 5 is a flowchart showing the image forming process in a third embodiment of the present invention.

With the second embodiment, when a version upgrade is being performed in the peripheral device 20 for use in the image forming process request extracted from the job queue 11, the process execution control section 14 reserves the execution of the image forming process, without starting the execution. However, the process to be performed by the peripheral device 20 in the image forming process may only be a portion of the total job. To address such situations, in a third embodiment of the present invention, a process portion not using the peripheral device 20 in which the version upgrade is being performed is, when possible, executed first, while the process portion to be performed with the unavailable peripheral device 20 is temporarily held as the reserved job until the device becomes available. A process execution control in the third embodiment will be described hereinafter with reference to the flowchart shown in FIG. 5.

It is assumed that the process execution control section 14 extracts the image forming process request registered in the job queue 11 (step 101), and starts the process. In this case, the request analysis section 16 analyzes the process content of the image forming process request, thereby divides the image forming process into a process step portion requiring the process in the peripheral device 20 and another portion, and specifies the peripheral device 20 for use in each step (step 121). Subsequently, the judgment section 15 judges whether or not the version upgrade is performed in the peripheral device 20 specified by the request analysis section 16 (step 103). Subsequently, when the version upgrade is judged to be performed in the peripheral device 20 for use in the image forming process as the execution object, the report section 17 allows the input/output section 12 to display the confirmation message indicating, for example, "The requested process step using the "peripheral device" cannot be executed. Press the start button and the process step will be reserved." (step 122). In this case, when the start button is not pressed, the execution of the process is rejected similarly as the second embodiment. However, when the start button is pressed, the process execution control section 14 in the third embodiment temporarily holds inside the process step using the peripheral device 20 with the version upgrade performed therein as the reserved job in the image forming process based on the request (steps 112, 123). Subsequently, only the process step not using the peripheral device 20 with the version upgrade performed therein is executed by the process execution section 13 (step 124).

The judgment section 15 constantly monitors whether or not the version upgrade ends in the peripheral device 20 (step 114). Upon recognizing that the version upgrade ends, the process execution control section 14 adjusts the job registered in the job queue 11 and starts the execution of the reserved job (step 125).

For example, during the version upgrade of the finisher, the job using the finisher is inputted into the job queue 11 and starts to be executed. In this case, the request analysis section 16 analyzes the job and divides the job into a step using the finisher and a step not using the finisher. Subsequently, the process execution control section 14 allows the process execution section 13 to execute the process step immediately before using the finisher, for example, until printing object data is formed into raster, and thereafter brings the process execution section into a waiting state. Subsequently, after confirming the end of the version upgrade of the finisher, the waiting state is canceled and the reserved job is executed.

According to the third embodiment, only the process step portion using the peripheral device 20 is reserved instead of the whole image forming process. The process step not using the peripheral device 20 is first executed. Therefore, the execution can be ended quickly after the process step is regarded as the execution object, as compared with the reservation of the whole image forming process.

It is to be noted that the step 124 is executed simultaneously with and in parallel with the steps 114, 125 as not shown in the flowchart. There is logically a possibility that the version upgrade precedently ends. Therefore, it is necessary to establish synchronization between the process step using the peripheral device 20 and the process step in which the peripheral device is not used.

Fourth Embodiment

Generally, after completion of the version upgrade of the control program, the peripheral device 20 is restarted in order to incorporate the content of the version upgrade, either automatically or in response to a reset request from the image forming apparatus 10 having recognized the completion of the upgrade procedure. However, if the image forming apparatus 10 simultaneously restarts in response to the restart on the peripheral device 20 side, the job stored in the job queue 11 of the image forming apparatus 10 will be lost. Moreover, because the version of the control program operating in the peripheral device 20 is upgraded, compatibility of the system environment of the image forming apparatus 10, in conjunction with which it must operate, may become impaired.

To solve the problem, in a fourth embodiment of the present invention, even when the peripheral device 20 is restarted at the end of the version upgrade, the process in the process execution control section 14 is continued without restarting the image forming apparatus 10. That is, the judgment section 15 judges that the version upgrade in the peripheral device 20 has ended. At this time, even if a reset signal is received from the peripheral device 20, the process execution control section 14 ignores the signal, and continues executes the image forming process without restarting the image forming apparatus 10. Moreover, while the peripheral device 20 is executing a restarting process, the peripheral device 20 continues to output a pseudo-signal indicating the continuation of a starting state to the image forming apparatus 10. Thereby, the image forming process of the image forming apparatus 10 is not influenced, and the image forming process of the image forming apparatus 10 may be continuously executed.

What is claimed is:

1. An image forming system comprising:
    an image forming apparatus that executes an image forming process in response to an input image forming process request;
    at least one peripheral device that is connected to the image forming apparatus and that executes an installed control program to operate the peripheral device;
    a version upgrade unit that upgrades a version of the control program based on input program data;
    a judgment unit that judges whether or not the version upgrade unit is performing a version upgrade in the peripheral device; and
    a process execution control unit that controls the requested image forming process so that a process which uses the peripheral device for which the judgment unit has judged a version upgrade process is being performed is restricted while a process which uses the peripheral device for which the judgment unit has judged a version upgrade process is not being performed is executed.

2. The image forming system according to claim 1, further comprising:
    a request analysis unit that analyzes a process content of the input image forming process request and specifies the peripheral device to be used in executing the image forming process.

3. The image forming system according to claim 2,
    wherein the process execution control unit rejects the input request which uses the peripheral device in which a version upgrade process is being performed, and executes the image forming process in response to the input request which uses the peripheral device in which a version upgrade process is not being performed.

4. The image forming system according to claim 2,
    wherein, when a request for the image forming process which uses the peripheral device in which a version upgrade process is being performed is inputted, the process execution control unit accepts and reserves the request as a process to be executed after the version upgrade in the peripheral device is completed, without rejecting the request.

5. The image forming system according to claim 2,
    wherein the request analysis unit divides the image forming process into a process step which uses the peripheral device in which a version upgrade process is being performed and a process step which uses the peripheral device in which the version upgrade process is not performed, and
    executes the process step which uses the peripheral device in which the version upgrade process is not performed and reserves the process step which uses the peripheral device in which the version upgrade process is performed to be executed after the version upgrade in the peripheral device is completed.

6. The image forming system according to claim 1,
    wherein, when the peripheral device is restarted at the end of the version upgrade performed by the version upgrade unit, the process in said process execution control unit is continued without restarting said image forming apparatus.

7. The image forming system according to claim 1, further comprising:
    a report unit that reports that a version upgrade is being performed and the peripheral device is therefore unavailable.

8. The image forming system according to claim 7,
    wherein the report unit reports when the request for the image forming process which uses the peripheral device in which a version-upgrade process is being performed is inputted.

9. The image forming system according to claim 1,
wherein the judgment unit detects a version upgrade signal sent from the version upgrade unit to thereby recognize that a version upgrade is being performed.

10. The image forming system according to claim 1,
wherein the judgment unit sends an inquiry signal to the version upgrade unit and judges whether or not a version upgrade is being performed based on a signal received in response to the inquiry signal.

11. An image forming process control method in an image forming system including:
an image forming apparatus that executes an image forming process in response to an input image forming process request; and
at least one peripheral device that is connected to the image forming apparatus and that executes an installed control program,
the method comprising:
receiving an input image forming request;
judging whether or not the control program is being updated in the peripheral device; and controlling the requested image forming process so that a process which uses the peripheral device for which it is judged by the judging step that the control program is being updated is restricted while a process which uses the peripheral device for which it is judged by the judging step that the control program is not being performed is executed.

12. The image forming process control method according to claim 11, further comprising:
specifying the peripheral device to be used in executing the image forming process by analyzing the image forming process request.

13. The image forming process control method according to claim 12, further comprising:
when a request for the image forming process is input while the control program of the peripheral device is being updated, reserving the request, and
starting execution of the process for the reserved request after the version upgrade in the peripheral device has been completed.

14. The image forming process control method according to claim 11, further comprising:
dividing the image forming process into a process step which uses the peripheral device in which a version upgrade process is being performed and a process step which uses the peripheral device in which the version upgrade process is not performed;
specifying the peripheral device which is used in executing the image forming process;
executing the process step which uses the peripheral device in which the version upgrade is not performed; and
starting execution of the process step which uses the peripheral device in which the version upgrade is performed after the version upgrade is completed.

15. The image forming process control method according to claim 11, further comprising:
continuing the execution of the image forming process without restarting the image forming apparatus, when the peripheral device is restarted at the end of a version upgrade process.

16. The image forming process control method according to claim 12, further comprising:
reporting that the peripheral device cannot be used when a version upgrade is being performed in the peripheral device.

* * * * *